(12) United States Patent
Hamilton et al.

(10) Patent No.: US 12,033,125 B2
(45) Date of Patent: Jul. 9, 2024

(54) VOICE-DEVICE AIDED OPERATION

(71) Applicant: NCR Voyix Corporation, Atlanta, GA (US)

(72) Inventors: Daniel Joseph Hamilton, Athens, GA (US); Sowmya Vipin Anchan, Cumming, GA (US); Linda Marie Black, Marietta, GA (US); Charmelle C. Harris-Dandridge, Lawrenceville, GA (US); Danyun Yu, Naperville, IL (US)

(73) Assignee: NCR Voyix Corporation, Atlanta, GA (US)

( * ) Notice: Subject to any disclaimer, the term of this patent is extended or adjusted under 35 U.S.C. 154(b) by 226 days.

(21) Appl. No.: 15/799,447

(22) Filed: Oct. 31, 2017

(65) Prior Publication Data

US 2019/0130376 A1    May 2, 2019

(51) Int. Cl.
*G06Q 20/20* (2012.01)
*G06Q 20/18* (2012.01)
*G06Q 20/32* (2012.01)
*H04M 1/7243* (2021.01)

(52) U.S. Cl.
CPC ............ *G06Q 20/20* (2013.01); *G06Q 20/18* (2013.01); *G06Q 20/3272* (2013.01); *H04M 1/7243* (2021.01)

(58) Field of Classification Search
CPC .... G06Q 20/20; G06Q 20/18; G06Q 20/3272; H04M 1/72547
See application file for complete search history.

(56) References Cited

U.S. PATENT DOCUMENTS

| | | | |
|---|---|---|---|
| 8,849,791 B1* | 9/2014 | Hertschuh | G06Q 30/0617 707/713 |
| 8,977,554 B1* | 3/2015 | Hertschuh | G06Q 30/0623 704/270 |
| 9,595,029 B1* | 3/2017 | Catoe | G07G 1/14 |
| 9,646,295 B1* | 5/2017 | Kanuganti | G06Q 20/322 |
| 9,774,966 B1* | 9/2017 | Bundy | G06F 3/162 |
| 9,792,901 B1* | 10/2017 | Saleem | G10L 15/22 |
| 10,073,953 B2* | 9/2018 | Xing | G06Q 30/06 |
| 10,204,327 B2* | 2/2019 | Katzin | G06Q 20/4016 |
| 2002/0190124 A1* | 12/2002 | Piotrowski | G07C 9/37 235/382 |
| 2005/0136949 A1* | 6/2005 | Barnes, Jr. | G06Q 10/02 455/461 |

(Continued)

*Primary Examiner* — Michael Jared Walker
(74) *Attorney, Agent, or Firm* — Schwegman Lundberg & Woessner, P.A.

(57) ABSTRACT

Various embodiments herein each include at least one of systems, methods, devices, and software voice-device aided operation, such as operation of a store, elements therein, and providing customer assistance, among other voice device capabilities. One embodiment, in the form of a method, includes receiving voice input at a Point-Of-Sale (POS) location, the voice-input including a command utterance. This method may then transmit the voice input via a network to a network service for processing and then receive at least one response to the transmitted voice command upon which a data processing action may be performed, such as providing a voice output based on a received text, manipulating a computing device or an output device thereof, and the like.

6 Claims, 4 Drawing Sheets

(56) References Cited

U.S. PATENT DOCUMENTS

| | | | | |
|---|---|---|---|---|
| 2006/0016884 A1* | 1/2006 | Block | .................. | G07G 1/0081 |
| | | | | 235/381 |
| 2010/0009720 A1* | 1/2010 | Cha | ........................ | G06F 3/165 |
| | | | | 455/566 |
| 2012/0096358 A1* | 4/2012 | Barnes, Jr. | ......... | G06Q 20/3224 |
| | | | | 715/728 |
| 2012/0123924 A1* | 5/2012 | Rose | .................. | G06Q 20/3276 |
| | | | | 705/35 |
| 2012/0303425 A1* | 11/2012 | Katzin | ................... | G06Q 20/32 |
| | | | | 705/14.4 |
| 2014/0024332 A1* | 1/2014 | Droste | ................ | H04L 12/1895 |
| | | | | 455/404.2 |
| 2014/0248852 A1* | 9/2014 | Raleigh | ................... | H04L 47/22 |
| | | | | 455/407 |
| 2014/0330659 A1* | 11/2014 | Yopp | .................... | G06Q 20/202 |
| | | | | 705/21 |
| 2014/0368339 A1* | 12/2014 | Thaker | ................... | G08B 21/24 |
| | | | | 340/539.32 |
| 2015/0186892 A1* | 7/2015 | Zhang | ............. | G06Q 20/40145 |
| | | | | 705/44 |
| 2015/0324635 A1* | 11/2015 | Tanaka | ............. | G06K 19/07749 |
| | | | | 348/150 |
| 2016/0019497 A1* | 1/2016 | Carvajal | ............... | H04W 4/029 |
| | | | | 701/519 |
| 2017/0068952 A1* | 3/2017 | Brockmann | ....... | G06Q 20/4014 |
| 2017/0243262 A1* | 8/2017 | Pan | ........................ | G07B 15/02 |
| 2017/0286948 A1* | 10/2017 | Mei | .................... | G06Q 20/3278 |
| 2017/0293740 A1* | 10/2017 | Xing | ..................... | G06Q 30/0226 |
| 2017/0293910 A1* | 10/2017 | Tinskey | ............. | G06Q 20/3674 |
| 2019/0080691 A1* | 3/2019 | Meng | ..................... | G10L 15/22 |

\* cited by examiner

VOICE-DEVICE AIDED OPERATION

BACKGROUND INFORMATION

Increasing employee productivity is a continuing desire for employers in their efforts to control costs. Lower operating costs leaves more for profit, bonuses, or competitive advantage (or lower fundraising in the event of non-profit organizations). At the same time, increased employee productivity can provide opportunities for greater customer service with existing or even lower staffing.

At the same time, there are now many more large-footprint retail stores than in the past. While these stores provide a great variety of goods, finding items in these large stores and finding customer assistance can be difficult. As a result, some customers avoid such large stores in favor of smaller boutiques. Other customers shop online where product information is readily available. However, the same issues also can be experienced in smaller retail stores when staffing levels are low or during peak periods of customer visits. Thus, retailers of all sizes see to improve not only worker productivity, but also customer experiences.

SUMMARY

Various embodiments herein each include at least one of systems, methods, devices, and software voice-device aided operation, such as operation of a store, elements therein, and providing customer assistance, among other voice device capabilities.

One embodiment, in the form of a method, includes receiving voice input at a Point-Of-Sale (POS) location, the voice-input including a command utterance. This method may then transmit the voice input via a network to a network service for processing and then receive at least one response to the transmitted voice command upon which a data processing action may be performed, such as providing a voice output based on a received text, manipulating a computing device or an output device thereof, and the like.

Another method embodiment includes selecting at least one script for execution based on an audio recording received via a network. The audio recording, in some embodiments, includes a voice command identifying the at least one script that when processed invokes data processing activity with regard to at least one of an action on a device from which the audio recording is received and on another data processing device of a facility where the POS terminal is located. The method may then execute the at least one script with at least one of data indicating a source of the audio recording and data representing an utterance included in the audio recording as an argument to perform data processing activity invoked by the at least one script, the data processing action.

Another embodiment is in the form of a system. A system of such embodiments includes a processor, a network interface, and a memory storing instructions executable by the processor to perform data processing activities. These data processing activities may include selecting at least one script for execution based on an audio recording received via the network interface, the audio recording including a voice command identifying the at least one script that when processed invokes further data processing activity with regard to at least one of an action on a device from which the audio recording is received and on another data processing device of a facility. Some embodiment may then execute the at least one script with at least one of data indicating a source of the audio recording and data representing an utterance included in the audio recording as an argument to perform further data processing activity invoked by the at least one script, the data processing action.

DETAILED DESCRIPTION

Figure 1:
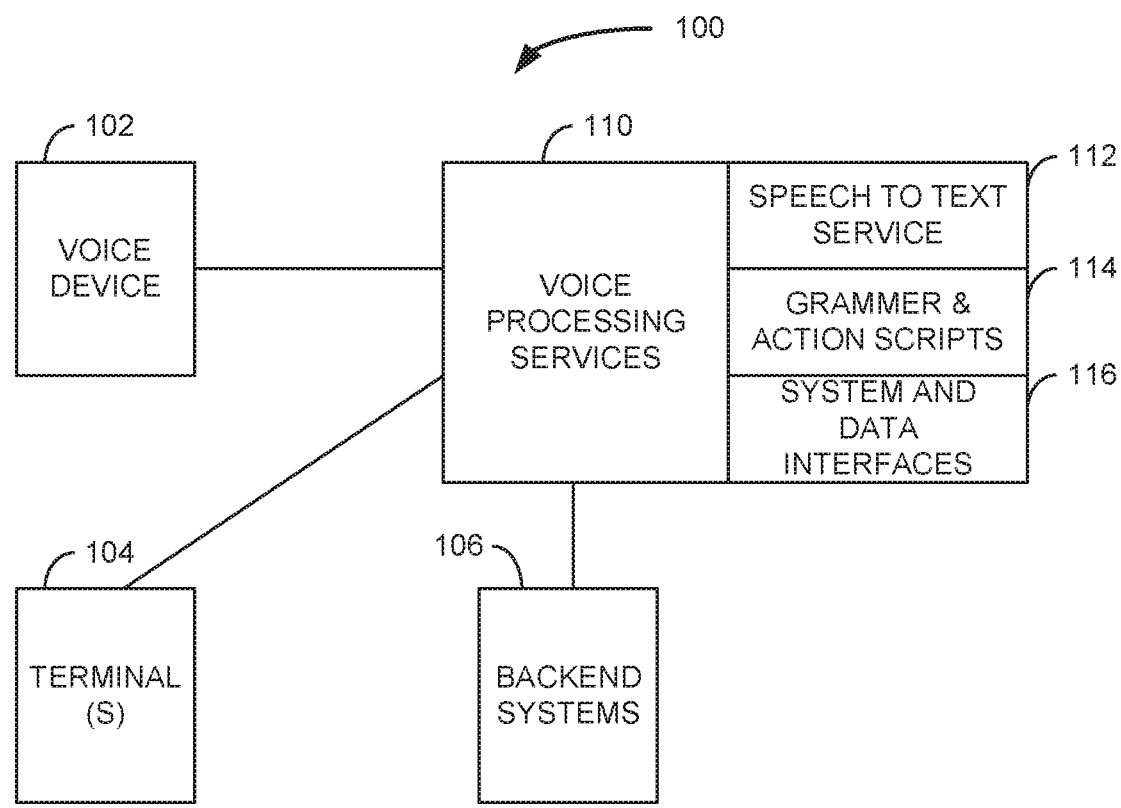
FIG. 1 is a logical block diagram of a system architecture, according to an example embodiment.

Voice recognition remains a mostly untapped tool for engaging customers and assisting employees at retail stores. Various embodiments herein provide voice-device enabled solutions to assist customers and store employees, such as at checkout stations and at some or all product locations within a store, to enhance both the customer and employee experiences. Benefits range from being a fun novelty, to upselling, advertising, providing customer assistance, to aiding in improving employee productivity. Some embodiments are built upon voice-device, or voice assistant, platforms such as ALEXA available from AMAZON.COM, INC. of Seattle, Washington, SIRI available from APPLE, INC. of Cupertino, California, CORTANA available from MICROSOFT, INC. of Redmond, Washington, and other such solutions. Other embodiments may be or include stand-alone or proprietary platform solutions. Regardless of the platform, various embodiments may be deployed on one or more types of voice-enabled devices, which may include smart-speaker devices, personal computers, mobile devices (e.g., smartphones, tables, smartwatches, etc.), terminals (e.g., clerk-assisted and self-service), Automated teller machines, kiosks, set-top boxes, smart controllers within automobiles, and the like.

Some embodiments that are tailored to retail stores address retail store tasks that can be tedious to manually perform, especially with many different products and configuration options. Price Lookup, for example, requires knowing a 10-digit PLU barcode number of the item an employee or customer wants to look up. Changing configuration or getting information quickly can be time consuming and require a lot of searching when there is a large volume of options available as is the case in convenience stores, big-box retailers, and the like.

Voice control, as in the various embodiments herein, eases the burden of needing to have such an intimate knowledge of the system or having to go through a more manual, often time consuming process to get information and perform tasks. Further, customer facing deployments empower customers and alleviate employees from performing such tasks. In such embodiment, By simply asking "What is the price of coke" the solution may respond with the appropriate price thereby saving time and effort on both the part of the employee and customer.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100 architecture, according to an example embodiment. The system 100 is an example of a system on which some embodiments may be deployed. At a high-level, the system 100 includes a network, such as the Internet, that interconnects a voice device 102 and a server on which voice processing services 110 are performed. The voice device 102 may be a smart-speaker device, such as an ECHO-type device available from AMAZON.COM, INC. or other deivce on which a voice-enabled personal assistance solution may be accessed, such as a personal computer, mobile devices (e.g., smartphones, tables, smartwatches, etc.), terminals (e.g., clerk-assisted and self-service), an automated teller machine (ATM), kiosk, set-top box (i.e., television set-top box), a smart controller within an automobile, and the like.

The voice processing services 110 may include a plurality of services, such as a speech-to-text service 112, grammar and action script services 114, and system and data interface services 116. The speech-to-text service 112 may operate to identify text within an audio recording received over the network from the voice device 102 by the server on which the voice processing services 110 are deployed.

The grammar and action scripts service 114 includes a set of trigger words or phrases and respective scripts. The trigger words or phrases are searched for by an engine of the voice processing services 110 that processes text from the speech-to-text service 112. The engine, upon identifying an occurrence of a trigger word or phrase then executes a script associated therewith. The script may utilize other text in the audio recording, as may be received from the speech-to-text service 112, as one or more arguments for performing one or more data processing activities of the script. Such activities may include retrieving data, such as a price of a product, and returning the data to the calling voice device 102 either as a generated audio recording generated by a text-to-speech service or as text that will be converted to audible speech or be presented by the audio deivce or other device coupled thereto. The data processing activities may include other activities, such as restarting another networked device, such as a terminal 104, interacting with other systems to perform transactions or obtain other data such as one or more backend systems 106 (e.g., non-customer or employee facing systems that may store data, process payments, record employee hours, etc.).

In one embodiment, the voice device 102 may be deployed at a checkout station of a retailer. The checkout station may be an assisted or a self-service checkout and the voice device 102 provides voice interaction services to one or both of a teller and a customer. The voice device 102 may receive a trigger input, such as an activation phrase followed by a query. The trigger phrase may be a simple phrase, such as "please ma'am." The query may be, "please ma'am, what is the price of cola?" The trigger phrase, when detected by the voice device captures a recording of the audio and provides the query over the network to the voice processing services 110. The speech-to-text service 112 then processes the audio to generate text and provides that text to the engine, the engine identifies a particular trigger word or phrase defined in a grammar and action script and passes processing the grammar and action scrips service 114 to process the query. Processing the price lookup for cola may include, as defined in the particular action script, retrieving pricing data from a backend system 106 that may be accessed via the system and data interfaces service 116 that enable data communication with various systems, terminals, and other devices over the network. The obtained data may then be returned to the voice device 102, either as audio or as data, or the pricing data may also or alternatively be provided over the network to another computing deivce, such as the terminal 104 for presentation thereon.

Figure 2:
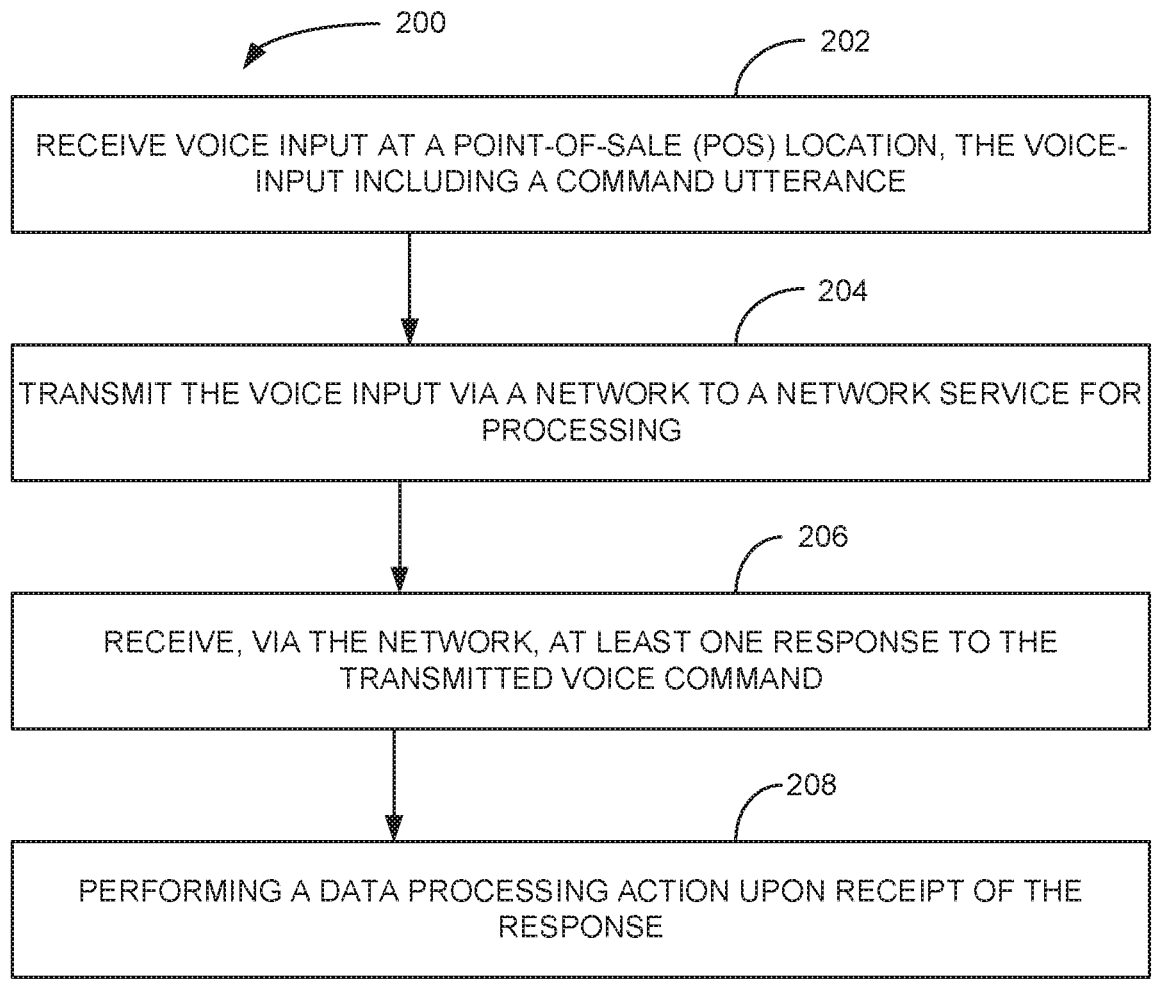
FIG. 2 is a block flow diagram of a method, according to an example embodiment.

FIG. 2 is a block flow diagram of a method 200, according to an example embodiment. The method 200 is an example of a method that may be performed on a voice deivce 102 located at a POS, such as a checkout station, in some embodiments.

The method 200 includes receiving 202 voice input at a POS location, the voice-input including a command utterance and transmitting 204 the voice input via a network to a network service for processing, such as to a service on which the voice processing services of FIG. 1 execute. The method 200 further includes receiving 206, via the network, at least one response to the transmitted voice command and performing 208 a data processing action upon receipt of the response.

In some embodiments of the method 200, the voice input is recorded as an audio data item within a memory of a device that receives the voice input. The voice input may be received by a smart-speaker device deployed at the point-of-sale terminal in some embodiments. In other embodiments, the voice input is captured by a microphone coupled to a POS terminal at the POS location.

Figure 3:
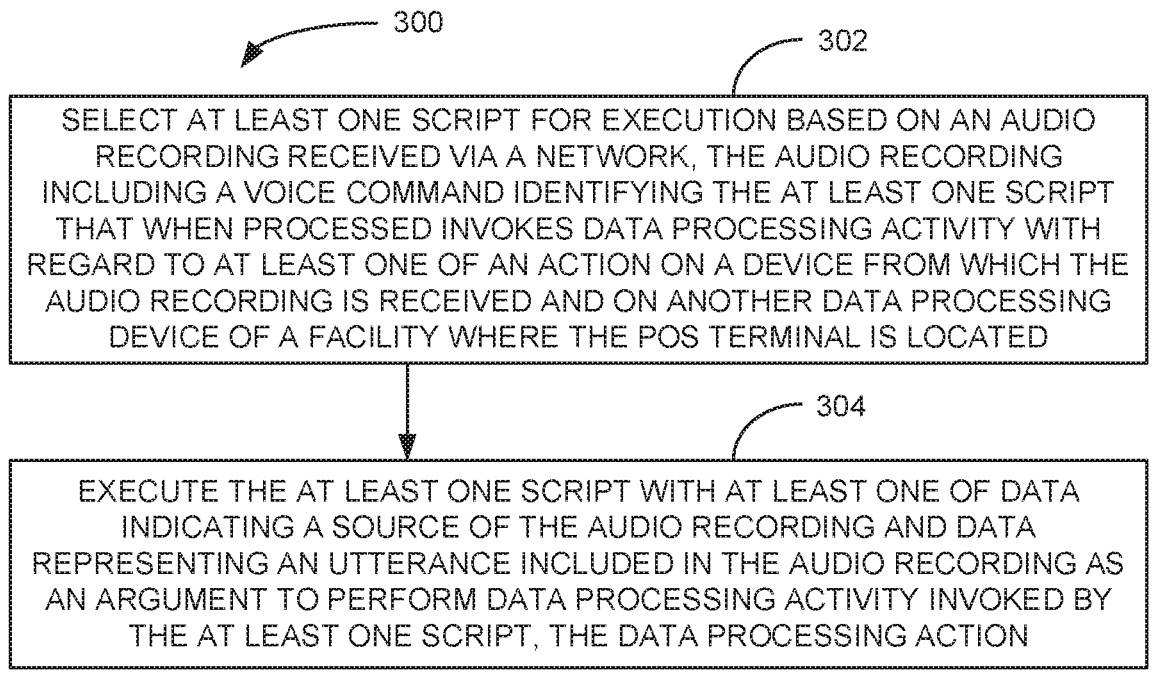
FIG. 3 is a block flow diagram of a method, according to an example embodiment.

FIG. 3 is a block flow diagram of a method 300, according to an example embodiment. The method 300 may be performed by a voice processing service, such as one or more of the voice processing services 110 of FIG. 1.

The method 300 includes selecting 302 at least one script for execution based on an audio recording received via a network. The audio recording may be received from a voice device 102 of FIG. 1 in some embodiments which may execute according to the method 200 of FIG. 2. The audio recording in the method 300 typically includes a voice command identifying the at least one script that when processed invokes data processing activity with regard to at least one of an action on a device from which the audio recording is received and on another data processing device of a facility where the POS terminal is located. This other device may be physically located at the same facility, such as a POS terminal device, a door lock, a lighting system, a heat, ventilating, and cooling system, and the like. In other embodiments, this other device may be located elsewhere but is involved in processing data related to that location.

The method 300 further includes executing 304 the at least one script with at least one of data indicating a source of the audio recording and data representing an utterance included in the audio recording as an argument to perform data processing activity invoked by the at least one script, the data processing action.

In some embodiments of the method 300, the audio recording is received via the network from a device associated with a POS terminal, which may be a teller-assisted or self-service POS terminal.

In some embodiments of the method 300, the action on the device from which the audio recording is received includes audible speech from a speaker as confirmation of a data processing action.

Figure 4:
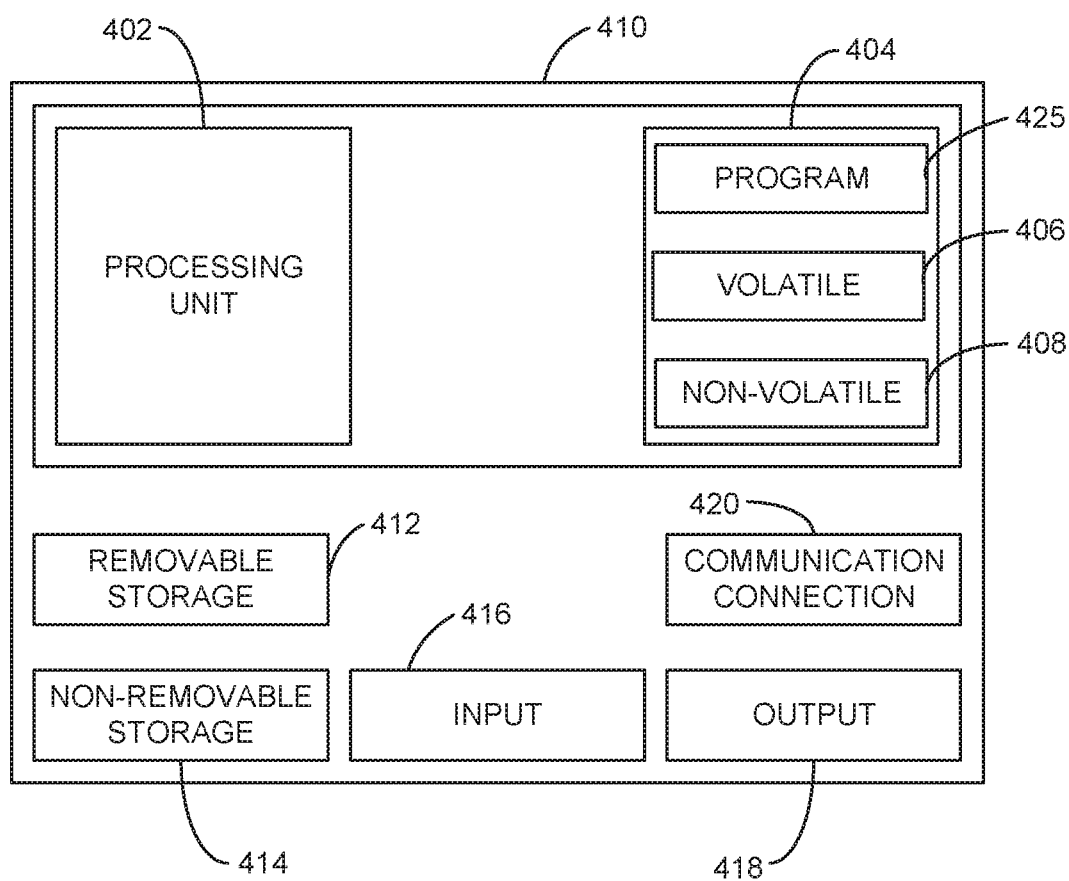
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device is in the form of a voice device, such as the voice device 102 of FIG. 1. Another example computing device in the form of a computer 410, such as a computer on which voice processing services 110 or backend systems 106 may be deployed.

The computing device, such as the computer 410, may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or an app or application that executes on a voice device, a mobile device, or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:

receiving a voice input at a voice input device located within a store, wherein the voice input device is coupled to a point-of-sale (POS) terminal involved with data processing of transactions at a self-service POS location within the store, the voice input including a command utterance that identifies a command including a corresponding script to be executed by a network service in response to the voice input, the script, when executed, invoking data processing activity with regard to at least one of an action on both the voice input device that received the voice input and on another data processing device of the store, the voice input including a command to change a configuration setting of the POS;

transmitting the voice input via a network to the network service for processing to effectuate the configuration setting change;

receiving, via the network, at least one response to the transmitted voice input; and performing a data processing action on the POS terminal associated with the self-service POS location within the store upon receipt of the response, the data processing action including providing an audible output from the voice input device including information related to the command to change the configuration setting of the POS terminal, wherein the voice input device is further configured to execute a localized script stored locally on the voice input device to perform at least part of the data processing action without requiring processing by the network service.

2. The method of claim 1, wherein the voice input is recorded as an audio data item within a memory of the voice input device that receives the voice input.

3. The method of claim 2, wherein the voice input device is a microphone of a smart-speaker device deployed at the point-of-sale location.

4. The method of claim 2, wherein the voice input device is a smart speaker with a microphone coupled to the POS terminal at the self-service POS location.

5. The method of claim 1, wherein the data processing action is performed according to a data processing command received with the at least one response.

6. The method of claim 1, wherein the at least one response includes a response received by a networked device that is a different device from the voice input device which received the voice input.

* * * * *